United States Patent Office 3,554,696
Patented Jan. 12, 1971

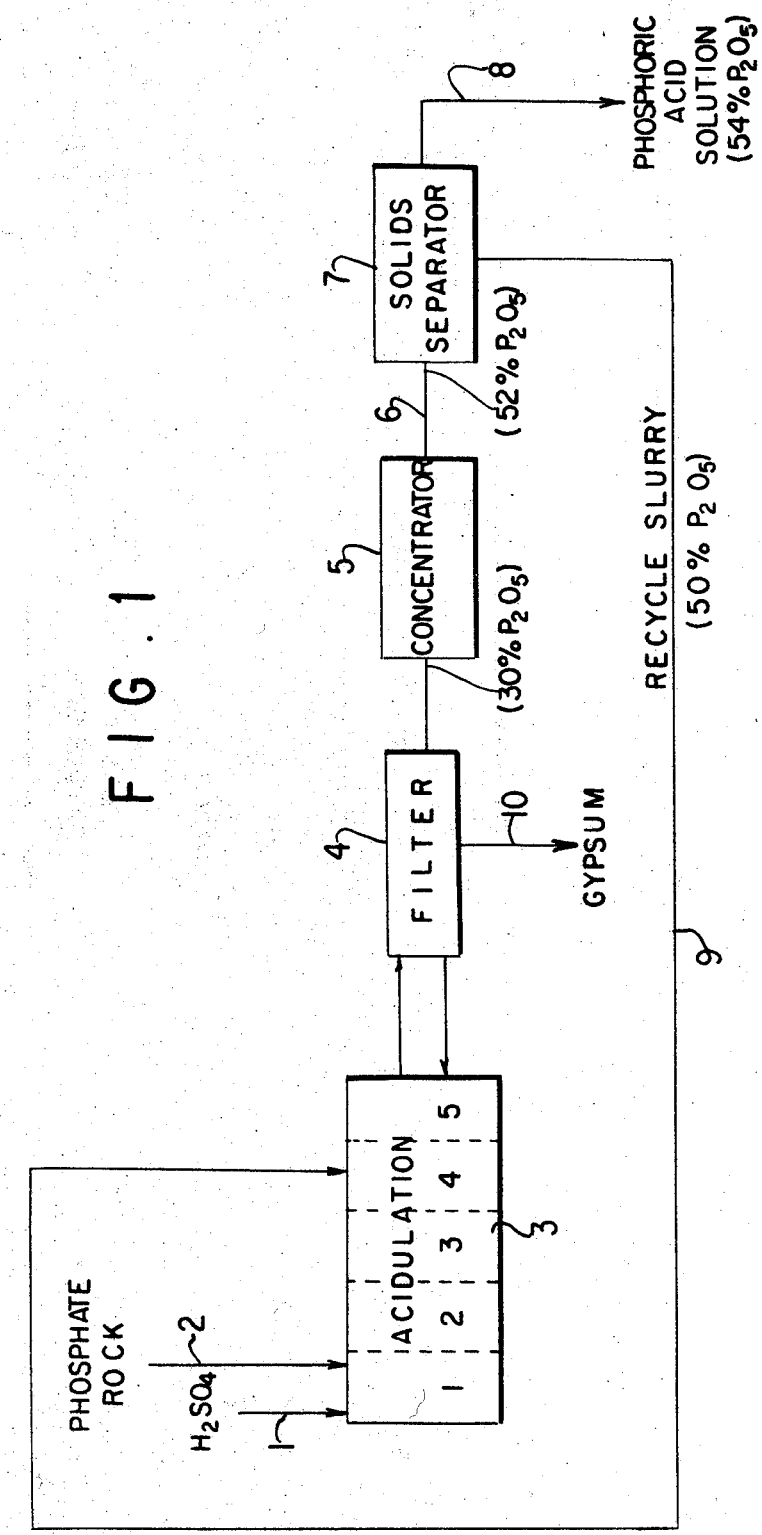

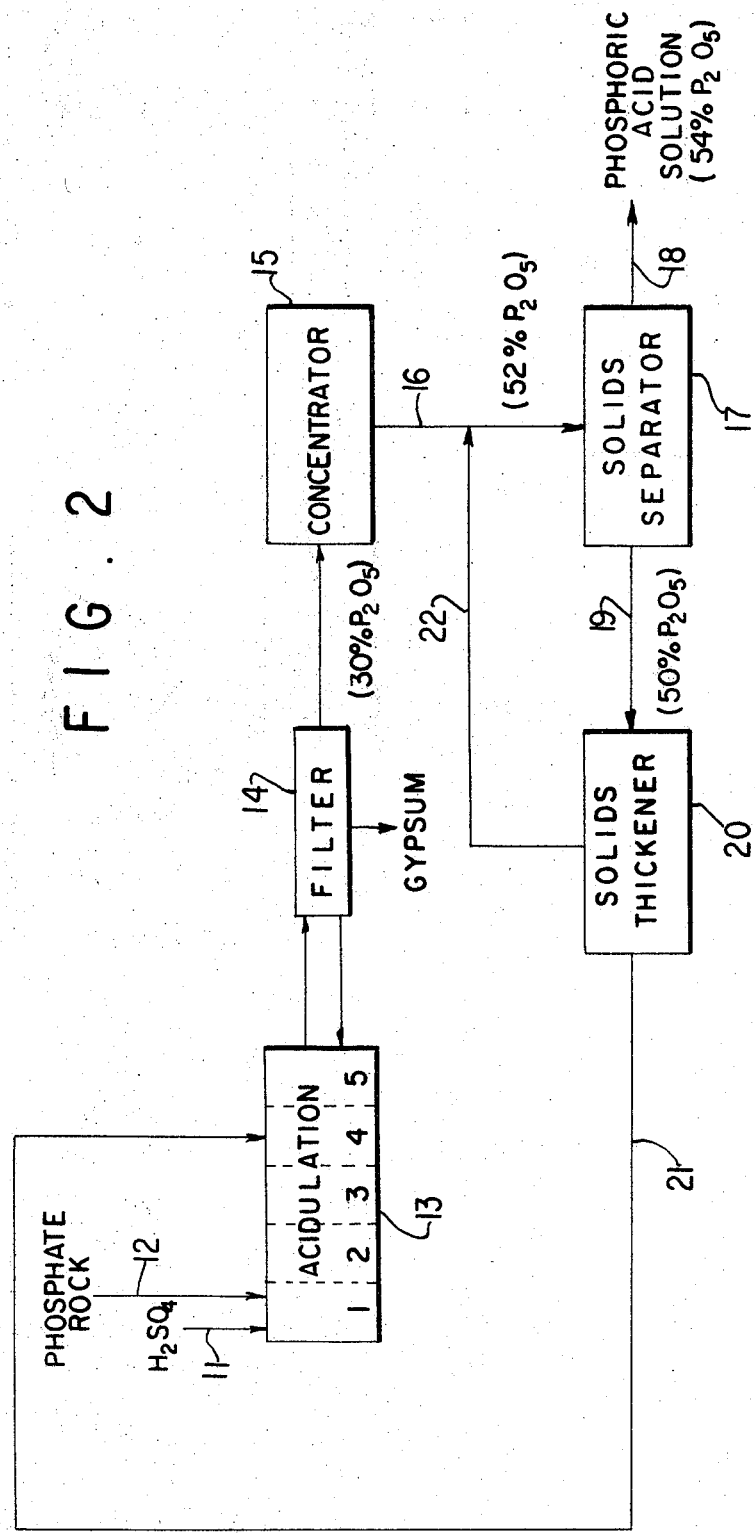

3,554,696
WET PROCESS PHOSPHORIC ACID MANUFACTURE
Gerald E. G. Wilkinson, Temple Terrace, and Theodore T. Houston, Tampa, Fla., assignors to Tennessee Corporation, New York, N.Y., a corporation of Delaware
Filed May 6, 1968, Ser. No. 726,688
Int. Cl. C01b 25/22
U.S. Cl. 23—165                                11 Claims

ABSTRACT OF THE DISCLOSURE

A filtered and concentrated wet process phosphoric acid solution is separated from the fine solids that form therein during the concentration operation. These solids contain appreciable quantities of $P_2O_5$ in the form of iron or aluminum phosphates. The separated fine solids are recycled to the phosphate rock acidulation operation. The solids are introduced to either the first acidulation stage or, preferably, one of the intermediate reaction stages. The fine solids are dissolved in the acidulation mixture and the $P_2O_5$ content thereof is recovered in the product phosphoric acid solution. No significant increase in $P_2O_5$ loss in the by-product gypsum results. Furthermore, the level of impurities, such as iron and aluminum, in the resulting phosphoric acid solution reaches a tolerable equilibrium level after which no continuing build up of impurities in said phosphoric acid solution results.

BACKGROUND OF THE INVENTION

Field of the invention

This invention relates to the manufacture of phosphoric acid by the wet process. More particularly, it relates to the recovery of the $P_2O_5$ values from the fine solids contained in the wet process phosphoric acid after concentration of the weak, filtered phosphoric acid resulting from acidulation of phosphate rock.

Description of the prior art

As well known in the art, wet process phosphoric acid is produced by the multiple stage reaction of phosphate rock with sulfuric acid. The reaction mixture is filtered to separate by-product gypsum from the resulting phosphoric acid solution. The weak, filtered phosphoric acid containing generally from about 26 to about 32 percent $P_2O_5$ is concentrated, as by evaporation, to produce the phosphoric acid of commerce which generally contains from about 52 to about 54 percent $P_2O_5$. Particularly during the concentration of the phosphoric acid solution, fine solids are formed and are removed in the production of the phosphoric acid of commerce. These fine solids, comprising iron and aluminum phosphates, contain an appreciable quantity of $P_2O_5$, often as much as 10% of the total $P_2O_5$ content of the phosphate rock. It is highly desirable that these solids be utilized in a manner permitting the recovery of the $P_2O_5$ values contained therein.

It has been proposed that the fine solids be employed in the manufacture of triple superphosphate. Alternately, it has been proposed that the fine solids be ammoniated to produce a mixed fertilizer composition. A major disadvantage of each of these proposals is that a definite amount of co-product, i.e. triple superphosphate or the mixed fertilizer composition, must necessarily be produced in association with the production of a given quantity of wet process phosphoric acid. In a market of decreasing triple superphosphate demand and of increasing demands for agricultural phosphoric acid, this necessary combination of wet process phosphoric acid and co-product production is ill-suited to the market realities in the industry.

It is an object of the present invention, therefore, to provide a process for enhancing the recovery of the $P_2O_5$ content of phosphate rock.

It is another object of the present invention to provide an improved technique for the manufacture of phosphoric acid by the wet process.

It is another object of the present invention to provide an improved process for the utilization of the fine solids formed in the concentration of wet process phosphoric acid.

It is a further object of the present invention to provide a process for recovering the $P_2O_5$ content of the fine solids separated from wet process phosphoric acid.

With these and other objects in mind, a summary and detailed description of the present invention is hereinafter set forth, the novel features of which are set forth in the appended claims.

SUMMARY OF THE INVENTION

The fine solids separated from the wet process phosphoric acid solution are, in accordance with the present invention, recycled to the phosphate rock acidulation operation. The solids may be injected into the acidulation mixture in either the first or in one of the intermediate stages of the multiple stage acidulation reaction. At least a portion of the recycled solids, which comprise iron and aluminum phosphates, are dissolved in the reaction mixture. The $P_2O_5$ values of these fine solids are recovered in the product phosphoric acid solution.

Surprisingly, the $P_2O_5$ loss in the by-product gypsum is not correspondingly increased. Likewise, the level of impurities in the resulting phosphoric acid solution increase to a tolerable equilibrium level, after which no significant increase in the level of impurities results.

The fine solids may be conveniently separated from the phosphoric acid solution by centrifugation. The fine solids are thereby obtained as a slurry that can be recycled directly to the acidulation operation. In another embodiment of the present invention, however, the slurry of fine solids is thickened prior to recycle. In this embodiment, a portion of the $P_2O_5$-containing fine solids is recycled as a thickened slurry to the acidulation operation, while the remaining portion of said fine solids, together with additional filtered and concentrated phosphoric acid solution, to the separation operation in which the product phosphoric acid solution is recovered.

BRIEF DESCRIPTION OF THE DRAWING

The present invention is hereinafter described in further detail with reference to the accompanying drawings in which:

FIG. 1 is a diagrammatic illustration of the embodiment in which the slurry of fine solids separated from the product phosphoric acid solution is recycled directly to the acidulation operation.

FIG. 2 is a diagrammatic illustration of another embodiment of the present invention in which said slurry is thickened prior to recycle to the acidulation operation.

DETAILED DESCRIPTION OF THE INVENTION

Wet process phosphoric acid is conventionally manufactured by acidulating phosphate rock with sulfuric acid, filtering to separate by-product gypsum from the resulting phosphoric acid solution, and evaporating the resulting solution so as to concentrate the weak, filtered phosphoric acid solution to generally from about 52 to about 54 percent $P_2O_5$. During the concentration operation, fine solids form in the phosphoric acid solution. These solids comprise iron and aluminum phosphates that contain appreciable quantities of $P_2O_5$. As indicated above, these fine solids are ordinarily removed from the product wet process phosphoric acid solution. This separation may be accomplished by various means known in the art, as by centrifugal filtration and by settling.

In accordance with the present invention, the separated fine solids are recycled to the acidulation operation. More particularly, the solids are recycled to a point in the acidulation operation sufficiently remote from the acidulation discharge point to allow sufficient time for this dissolving of the fine solids in the acidulation mixture so as to permit the recovery of the $P_2O_5$ values therefrom in the product phosphoric acid solution. In the manufacture of wet process phosphoric acid, the acidulation operation is commonly performed in a multiple stage operation in which a series of reaction tanks is employed. In an equivalent arrangement, the series of acidulation stages may be included within one reaction tank compartmentalized to produce a series of individual acidulation stages therein. While the number of acidulation stages is not critical, the acidulation of phosphate rock is commonly carried out with from about 3 to about 10 reaction stages or individual reaction tanks. In another embodiment of the wet process phosphoric acid operation, various single tank processes have also been employed. Such single tanks have no compartments per se, but generally have a series of agitators arranged therein so as to provide a series of agitation zones between the tank inlet and outlet points. Sulfuric acid and phosphate rock can be mixed, as in a mixing funnel, and circulated throughout the mixing tank containing baffles that direct the reaction mixture through the various agitation zones provided in the tank.

In a multiple tank or multiple stage operation, recycling the fine solids to either the first or preferably to an intermediate stage in the acidulation operation has been found satisfactory for the desired digestion of the fine solids in the reaction mixture. Recycling to an intermediate stage is generally preferred since the recycling to the first reaction stage makes necessary operational control adjustments throughout the entire acidulation operation rather than throughout only a portion of that operation. Recycling to the last acidulation stage, on the other hand, does not allow sufficient time for the digestion of the fine solids in the reaction mixture. If the fine solids were recycled to the last acidulation stage, therefore, $P_2O_5$ values occluded to the fine solids might be recovered, but the $P_2O_5$ values contained in the iron and aluminum phosphates themselves would not be recovered in appreciable amounts. It has been found particularly convenient to recycle the separated fine solids to the next to last acidulation stage. In a four stage acidulation operation, for example, the fine solids would be recycled, in accordance with the present invention, to either of the first three acidulation stages, preferably to the third stage. In a five stage operation, the fine solids would preferably be recycled to the fourth stage, although acidulation to either of the first three stages would also be within the scope of the present invention. Similarly, in a nine stage operation, the fine solids could be recycled to any of the first eight stages, preferably to the eighth stage. It is also within the scope of the present invention to recycle the fine solids to more than one of the indicated reaction stages.

In the single tank operation referred to above, the recycled solids should be introduced at a point sufficiently remote from the discharge, or take-off, point so as to allow for sufficient time for the digestion of the fine solids in the reaction mixture. The particular point in the acidulation operation to which the fine solids will be recycled will, of course, depend upon the particular characteristics of the single tank device employed. The recycled solids should not, however, be introduced into the reaction mixture in the immediate vicinity of the acidulation discharge point if the beneficial results of the present invention are to bo obtained.

Quite surprisingly, the process of the present invention has been found to result in an increased recovery of $P_2O_5$ in the product phosphorisc acid solution, while the loss of $P_2O_5$ in the by-product gypsum is not significantly increased. The $P_2O_5$ values of the iron and aluminum phosphates that comprise the separated fine solids, therefore, are recovered primarly in the product phosphoric acid solution. This increased recovery of $P_2O_5$ is accomplished, furthermore, without an unacceptable increase in the amount of impurities contained in the product phosphoric acid solution.

It has been found that, in the practice of the present invention, the aluminum and iron values reach a tolerable equilibrium level in the product phosphoric acid solution. No continuing build-up of the impurity level of these metals in the product solution results. Likewise, no increase in the fluorine content of the product phosphoric acid solution results from the practice of the present invention.

In the embodiment of the invention illustrated in FIG. 1, sulfuric acid and phosphate rock are fed to reaction tank 3 through lines 1 and 2 respectively. The tank 3 is partitioned so as to form five reaction stages for the acidulation of the phosphate rock. The acidulation mixture from the fifth stage of the acidulation operation passes to filter 4 in which the by-product gypsum is separated from the acidulation mixture and removed through line 10. A portion of the filtered phosphoric acid solution is recycled to the acidulation zone in accordance with conventional procedure. The remaining weak phosphoric acid solution, e.g. 30% by weight $P_2O_5$, is passed to concentrator 5 from which the more concentrated acid, e.g. 52% by weight $P_2O_5$, passes through line 6. During the concentration operation, fine solids, comprising primarily iron and aluminum phosphates, form in the thus filtered and concentrated acid.

In order to remove the fine solids from the filtered and concentrated acid, solids separator 7, such as a centrifugal filter or a suitable settling unit, is provided. The resulting phosphoric acid solution, such as 54% $P_2O_5$ solution, is recovered as product phosphoric acid solution in line 8. The fine solids are recovered as a slurry of solids in phosphoric acid solution, the slurry having, for example, a $P_2O_5$ concentration of about 50%. This slurry, in accordance with this embodiment of the present invention, is recycled through line 9 to the fourth stage of the multiple stage acidulation operation in tank 3. The fine solids thus introduced into the acidulation zone are digested in stages 4 and 5 of tank 3 so that at least a portion of the $P_2O_5$ content thereof is subsequently recovered as product phosphoric acid solution.

In another embodiment, the slurry of fine solids may be concentrated, as for example in solid bowl centrifuge, so that a more concentrated slurry is recycled to the acidulation operation. This embodiment is illustrated in FIG. 2 in which phosphoric acid and phosphate rock are fed through lines 11 and 12 respectively into reaction tank 13 having five acidulation stages. The acidulation mixture passes from the fifth stage to filter 14, in which byproduct gypsum is separated. The thus filtered phosphoric acid solution passes to concentrator 15 from which a concentrated phosphoric acid solution is removed through line 16. The solution is then passed into a suitable solids separator 17 from which the product phosphoric acid solution is removed through line 18. The fine solids separated from the phosphoric acid solution pass as a slurry through line 19 to solids thickener 20 from which a thickened slurry stream is withdrawn through line 21 and recycled to the next to last, or third, acidulation stage in tank 3. The thickened slurry may have, for example, about 40% by weight $P_2O_5$, and will constitute only a portion of the total fine solids removed from the product phosphoric acid solution. The remaining portion of the fine solids is recycled as a slurry in phosphoric acid solution through line 22 to the phosphoric acid-fine solids separation operation in unit 17. This embodiment has the advantage of recycling a smaller quantity of phosphoric acid solution to the acidulation operation since the recycled solution must also be reconcentrated.

The following specific examples are given for illustrative purposes only, and are not intended to limit the scope of the invention as hereinabove described and as set forth in the appended claims.

EXAMPLE I

Acidulation of Florida 68 BPL rock was accomplished with 93% $H_2SO_4$ and plant recirculating acid. After filtration and concentration to 47% $P_2O_5$, fine solids were separated from the resulting phosphoric acid solution by means of a centrifugal filter with double saran filter strips. A second acidulation was carried out using as the recirculating acid the acid produced in the first acidulation, Florida 68 rock and 93% $H_2SO_4$. The fine solids produced in the first acidulation were added to the recirculating acid, which was recycled to the acidulation zone of the batch-type process. The acidulation was continued for a sufficient time to assure the digestion of the fine solids in the reaction mixture. This cycle was then repeated with each acidulation being made using the solids and recirculating acid from the preceding acidulation. Each acidulation was smaller than the preceding one by the amount of primary and concentrated acid removed for analytical purposes. A total of eight runs were made. The distribution of materials in the first and the last four runs are as set forth in Table I below.

TABLE I

| | Runs | | | | |
|---|---|---|---|---|---|
| | 1 | 5 | 6 | 7 | 8 |
| Primary acid: | | | | | |
| $P_2O_5$, g | 376 | 174 | 146 | 132 | 182 |
| F, g | 32.2 | 14.8 | 12.9 | 10.8 | 12.9 |
| Fe, g | 8.0 | 4.47 | 3.79 | 3.56 | 5.08 |
| Al, g | 8.0 | 4.03 | 3.37 | 3.26 | 4.32 |
| $SO_4$, g | 18 | 7 | 8 | 11 | 13 |
| CaO, g | 17 | 6 | 6 | 4 | 4 |
| Gypsum: | | | | | |
| $P_2O_5$, g | 40 | 13 | 11 | 11 | 10 |
| F, g | 12.5 | 5.6 | 3.5 | 3.8 | 3.5 |
| Fe, g | 2.0 | 0.56 | 0.26 | 0.62 | 0.29 |
| Al, g | 2.6 | 1.11 | 0.87 | 0.87 | 0.70 |
| CaO, g | 759 | 260 | 207 | 174 | 149 |
| $SO_4$, g | 1,204 | 426 | 345 | 273 | 226 |
| $P_2O_5$, acid/$P_2O_5$, gypsum | 9.4/1 | 13.4/1 | 13.3/1 | 12/1 | 18.2/1 |
| $P_2O_5$, acid/F, Fe, Al, acid | 7.83/1 | 7.46/1 | 7.50/1 | 7.49/1 | 8.16/1 |

As can readily be seen from the data presented in Table I, the recirculation of the fine solids results in a proportionately greater recovery of $P_2O_5$ in the primary acid produced by the acidulation of phosphate rock, while the impurity level did not substantially increase in the product phosphoric acid solution.

EXAMPLE II

Acidulation of phosphate rock was accomplished in a conventional manner in a five stage acidulation operation at a rate of approximately 25 tons per hour. The fine solids comprising iron and aluminum phophates that formed during the concentration operation were recycled as a slurry to the fourth reaction stage without preliminary thickening. The results of this operation are set forth in Table II.

TABLE II

| | Days of operation | | | | | |
|---|---|---|---|---|---|---|
| | 1 | 4 | 7 | 10 | 11 | 12 |
| | Percent | | | | | |
| Rock: | | | | | | |
| $P_2O_5$ | 31.50 | 31.27 | 31.39 | 31.11 | 31.20 | 31.19 |
| CaO | 47.03 | 46.44 | 46.55 | 45.85 | 46.44 | 46.96 |
| MgO | 0.76 | 0.43 | 0.43 | 0.36 | 0.42 | 0.40 |
| $Fe_2O_3$ | 1.24 | 1.25 | 1.13 | 1.12 | 1.25 | 1.24 |
| $Al_2O_3$ | 1.17 | 1.12 | 1.15 | 1.15 | 1.09 | 1.02 |
| F | 3.94 | 3.84 | 3.87 | 3.79 | 3.76 | 3.81 |
| 30% acid: | | | | | | |
| $P_2O_5$ | 27.32 | 28.53 | 28.32 | 28.81 | 28.78 | 29.02 |
| CaO | 0.26 | 0.33 | 0.33 | 0.26 | 0.31 | 0.29 |
| MgO | 0.38 | 0.43 | 0.43 | 0.35 | 0.40 | 0.40 |
| $SO_4$ | 2.76 | 2.56 | 2.69 | 2.58 | 2.64 | 2.68 |
| $Fe_2O_3$ | 1.19 | 1.20 | 1.39 | 1.44 | 1.39 | 1.50 |
| $Al_2O_3$ | 0.85 | 1.02 | 1.00 | 0.98 | 1.02 | 0.94 |
| F | 2.48 | 2.43 | 1.85 | 1.81 | 1.76 | 1.78 |
| Solids | 0.42 | 0.65 | 0.50 | 0.45 | 0.47 | 0.53 |
| Concentrated 54% acid: | | | | | | |
| $P_2O_5$ | 50.63 | 53.04 | 52.84 | 52.53 | 53.03 | |
| CaO | 0.55 | 0.61 | 0.57 | 0.50 | 0.57 | |
| MgO | 0.70 | 0.75 | 0.79 | 0.66 | 0.74 | |
| $SO_4$ | 5.00 | 4.67 | 4.63 | 4.45 | 4.57 | |
| $Fe_2O_3$ | 2.03 | 1.98 | 2.56 | 2.56 | 2.48 | |
| $Al_2O_3$ | 1.64 | 1.79 | 1.81 | 1.81 | 1.86 | |
| F | 1.99 | 1.18 | 0.86 | 1.11 | 0.91 | |
| Solids | 3.15 | 5.92 | 10.37 | 6.48 | 6.60 | |
| Product phosphoric acid solution: | | | | | | |
| $P_2O_5$ | 53.93 | 52.79 | 53.05 | 53.21 | 53.13 | 52.77 |
| CaO | 0.09 | 0.08 | 0.12 | 0.06 | 0.05 | 0.04 |
| MgO | 0.73 | 0.84 | 0.83 | 0.71 | 0.79 | 0.78 |
| $SO_4$ | 3.96 | 4.28 | 3.55 | 3.65 | 3.62 | 3.77 |
| $Fe_2O_3$ | 1.52 | 1.46 | 1.64 | 1.77 | 1.71 | 1.73 |
| $Al_2O_3$ | 1.59 | 1.78 | 1.85 | 1.89 | 1.86 | 1.83 |
| F | 0.98 | 0.96 | 0.81 | 0.80 | 0.82 | 0.69 |
| Solids | 0.56 | 1.00 | 0.74 | 0.96 | 0.58 | 0.45 |
| $Fe_2O_3/P_2O_5$ | 0.028 | 0.028 | 0.031 | 0.033 | 0.032 | 0.033 |
| $Al_2O_3/P_2O_5$ | 0.029 | 0.034 | 0.035 | 0.036 | 0.035 | 0.035 |
| $F/P_2O_5$ | 0.018 | 0.018 | 0.015 | 0.015 | 0.015 | 0.012 |

As indicated by the results of this example, the level of $Fe_2O_3$ and $Al_2O_3$ concentration in the product phosphoric acid solution does not continually rise, but reaches a tolerable equilibrium level after which no further build-up of these impurities in the product phosphoric acid solution occurs. It should be noted that the fluorine level actually decreases in the 30% acid with time due to the recycle, with the fine solids, of phosphoric acid solution that has been defluorinated during concentration.

In similar fashion, tests have been conducted in which the slurry of fine solids separated from the phosphoric acid solution was passed through a conventional solid bowl centrifuge to thicken the slurry prior to recycle to the concentration operation. Under these conditions, only a portion, e.g. about ⅓, of the $P_2O_5$ values recycled in the embodiment of Example II were recycled to the acidulation operation. As in the embodiment of Example II, the $P_2O_5$ values contained in the separated fine solids were recovered primarily in the product phosphoric acid solution. The impurity level of the product solution did not continually increase beyond a tolerable equilibrium level.

The invention has been described herein with reference to particular embodiments thereof. It will be appreciated, however, that various changes and modifications can be made without departing from the scope of the invention as set forth in the appended claims.

Therefore, we claim:
1. In the manufacture of wet process phosphoric acid by the reaction of phosphate rock with sulfuric acid, filtration of the acidulation mixture to separate by-product gypsum from the resulting phosphoric acid solution, and evaporation so as to concentrate the weak, filtered phosphoric acid, said evaporative concentration causing the formation of particulate iron and aluminum phosphates, the improvement by means of which the recovery of the $P_2O_5$ values from said rock may be enhanced, said improvement comprising:
   (a) separating said phosphoric acid from the fine solids formed therein at a period substantially immediately after said concentration step, said fine solids having an appreciable quantity of $P_2O_5$ contained therein; and (b) recycling said fine solids to said acidulation mixture at a point sufficiently remote from the discharge point of the acidulation operation so as to permit digestion of fine solids in the reaction mixture, whereby at least a portion of the fine solids is disssolved in the acidulation mixture and the overall recovery of $P_2O_5$ is increased without a significant increase in the quantity of $P_2O_5$ loss in the by-product gypsum.

2. The process of claim 1 in which the acidulation is carried out in a multiple stage reaction process.

3. The process of claim 2 in which said fine solids are recycled to the first reaction stage.

4. The process of claim 2 in which said fine solids are recycled to an intermediate reaction stage.

5. The process of claim 2 in which the fine solids are recycled to the next to last reaction stage.

6. The process of claim 5 in which the acidulation of the rock occurs in five stages and the fine solids are recycled to the fourth reaction stage.

7. The process of claim 5 in which the acidulation of the rock occurs in four reaction stages and the fine solids are recycled to the third reaction stage.

8. The process of claim 1 in which the fine solids are separated from the phosphoric acid solution as a slurry.

9. The process of claim 8 and including the thickening of the fine solids slurry prior to recycle of said fine solids to the acidulation operation.

10. The process of claim 9 in which a portion of the $P_2O_5$ containing fine solids is recycled as a thickened slurry to the acidulation operation and the remaining portion of said fine solids is recycled as a slurry in phosphoric acid solution to the phosphoric acid-fine solid separation operation.

11. The process of claim 10 in which the fine solids are continuously recycled, the level of impurities in the separated phosphoric acid solution reaching an equilibrium level after which no continuing build up of impurities in said phosphoric acid solution occurs.

References Cited

UNITED STATES PATENTS

| | | | |
|---|---|---|---|
| 2,710,247 | 6/1955 | Knowles et al. | 23—165 |
| 2,861,869 | 11/1958 | Reeve | 23—123 |
| 3,455,651 | 7/1969 | Satterwhite et al. | 23—165 |

OSCAR R. VERTIZ, Primary Examiner

G. A. HELLER, Assistant Examiner

PO-1050
(5/69)

UNITED STATES PATENT OFFICE
CERTIFICATE OF CORRECTION

Patent No. 3,554,696          Dated January 12, 1971

Inventor(s) Gerald E.G. Wilkinson and Theodore T. Houston

It is certified that error appears in the above-identified patent and that said Letters Patent are hereby corrected as shown below:

In the caption of column 1, line 5, the assignee should be Cities Service Company, New York, N. Y., a corporation of Delaware.

Signed and sealed this 1st day of June 1971.

(SEAL)
Attest:

EDWARD M. FLETCHER, JR.
Attesting Officer

WILLIAM E. SCHUYLER, JR
Commissioner of Patents